(12) United States Patent
Choi

(10) Patent No.: US 10,178,672 B2
(45) Date of Patent: Jan. 8, 2019

(54) METHOD AND APPARATUS FOR ALLOCATING RESOURCE FOR CONTROL CHANNEL IN MULTI-BEAM ENVIRONMENT, AND METHOD AND APPARATUS FOR TRANSMITTING CONTROL CHANNEL IN MULTI-BEAM ENVIRONMENT

(71) Applicant: ELECTRONICS AND TELECOMMUNICATIONS RESEARCH INSTITUTE, Daejeon (KR)

(72) Inventor: Eun-Young Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 50 days.

(21) Appl. No.: 15/378,176

(22) Filed: Dec. 14, 2016

(65) Prior Publication Data

US 2017/0181169 A1     Jun. 22, 2017

(30) Foreign Application Priority Data

Dec. 16, 2015  (KR) .................. 10-2015-0180488
Dec. 6, 2016   (KR) .................. 10-2016-0165292

(51) Int. Cl.
*H04W 72/04*   (2009.01)
*H04L 5/00*    (2006.01)

(52) U.S. Cl.
CPC ....... *H04W 72/0453* (2013.01); *H04L 5/0032* (2013.01); *H04W 72/042* (2013.01)

(58) Field of Classification Search
CPC ............. H04L 5/0032; H04W 72/042; H04W 72/0453
See application file for complete search history.

(56) References Cited

U.S. PATENT DOCUMENTS

| 8,687,584 | B2* | 4/2014 | Yang ............... H04L 5/0053 370/329 |
| 9,363,808 | B2 | 6/2016 | Kim et al. |
| 9,363,809 | B2 | 6/2016 | Kim et al. |
| 9,374,813 | B2* | 6/2016 | Lee ................. H04L 5/0023 |
| 2009/0318157 | A1 | 12/2009 | Hoshino et al. |
| 2014/0161059 | A1 | 6/2014 | Lee et al. |
| 2015/0080004 | A1 | 3/2015 | Shin et al. |
| 2015/0358064 | A1 | 12/2015 | Benjebbour et al. |

FOREIGN PATENT DOCUMENTS

KR    10-2014-0099252 A    8/2014

* cited by examiner

*Primary Examiner* — Liton Miah
(74) *Attorney, Agent, or Firm* — Rabin & Berdo, P.C.

(57) ABSTRACT

A base station allocates at least one control channel element (CCE) to a first control channel earlier than allocating to the rest control channels other than the first control channel among a plurality of control channels corresponding to a first beam, when CCEs are allocated to the plurality of control channels corresponding to the first beam. Further, the base station allocates at least one CCE to the first control channel earlier than allocating to the rest control channels other than the first control channel among a plurality of control channels corresponding to a second beam, when CCEs are allocated to the plurality of control channels corresponding to the second beam.

5 Claims, 11 Drawing Sheets

METHOD AND APPARATUS FOR ALLOCATING RESOURCE FOR CONTROL CHANNEL IN MULTI-BEAM ENVIRONMENT, AND METHOD AND APPARATUS FOR TRANSMITTING CONTROL CHANNEL IN MULTI-BEAM ENVIRONMENT

CROSS-REFERENCE TO RELATED APPLICATION

This application claims priority to and the benefit of Korean Patent Application Nos. 10-2015-0180488 and 10-2016-0165292 filed in the Korean Intellectual Property Office on Dec. 16, 2015, and Dec. 6, 2016, the entire contents of which are incorporated herein by reference.

BACKGROUND OF THE INVENTION (a) Field of the Invention

The present invention relates to a method and an apparatus for allocating a resource for a control channel in communication environment (multi-beam environment) using a multi-beam.

Further, the present invention relates to a method and an apparatus for transmitting control information or a control channel in multi-beam environment.

(b) Description of the Related Art

To support the increasing data demand in a mobile communication system, a millimeter wave band in which a wide frequency is easily secured has emerged as a candidate band. The millimeter wave band has a big disadvantage in a path loss but may secure coverage based on a beamforming technique for overcoming the disadvantage.

When the beamforming is used like the system, if the multi-beam is used, capacity of one cell may be increased in proportion to the number of beams. However, when the multi-beam is simultaneously used for a data transmission, data of adjacent beams affect a main transmission beam as interference, which is a cause of performance deterioration. In this case, a control channel that transfers resource allocation information and control information requires a lower error rate than a traffic channel (data channel). Therefore, a method for removing interference or avoiding interference is required.

In the long term evolution (LTE) system, a method for avoiding interference considering an effect of adjacent cells is used. In detail, the method for avoiding interference divides resources based on a frequency base and transmits control information of cells at different resource locations, like an enhanced physical downlink control channel (ePDCCH). In this way, the interference with adjacent cells may be avoided.

In this case, the ePDCCH region is also used simultaneously with using the existing physical downlink control channel (PDCCH) region.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a structure, a method, and an apparatus for using resources while improving performance through cooperative communication with adjacent beams by using only the existing PDCCH region.

An example embodiment of the present invention provides a method for transmitting, by a base station, a first control channel for a first terminal that receives a first beam as main beam and a second beam adjacent to the first beam as an interference beam. The method may include: allocating at least one control channel element (CCE) to the first control channel earlier than allocating to the rest control channels other than the first control channel among a plurality of control channels corresponding to the first beam, when CCEs are allocated to the plurality of control channels corresponding to the first beam; and allocating at least one CCE to the first control channel earlier than allocating to the rest control channels other than the first control channel among a plurality of control channels corresponding to the second beam, when CCEs are allocated to the plurality of control channels corresponding to the second beam.

The allocating of at least one CCE to the first control channel among the plurality of control channels corresponding to the first beam may include allocating at least one first CCE of a plurality of CCEs for the first beam to the first control channel.

The allocating of at least one CCE to the first control channel among the plurality of control channels corresponding to the second beam may include allocating at least one second CCE corresponding to the at least one first CCE of a plurality of CCEs for the second beam to the first control channel.

The number of CCEs for the first beam may be equal to the number of CCEs for the second beam.

The allocating of at least one CCE to the first control channel among the plurality of control channels corresponding to the first beam may include: acquiring interference information by the second beam using information fed back from the first terminal; and determining a CCE allocation order for the first control channel based on the interference information.

The allocating of at least one CCE to the first control channel among the plurality of control channels corresponding to the second beam may include: generating the first control channel of the plurality of control channels corresponding to the second beam using first control information for the first terminal; generating a second control channel of the plurality of control channels corresponding to the second beam using second control information for a second terminal receiving the second beam as the main beam; and setting the CCE allocation order for the first control channel to be higher than a CCE allocation order for the second control channel.

Another embodiment of the present invention provides a method for transmitting, by a base station, a first control channel for a first terminal that receives a first beam as main beam and a second beam adjacent to the first beam as an interference beam. The method may include: allocating at least one first control channel element (CCE) of a plurality of CCEs for the first beam to the first control channel; and allocating the rest CCEs other than at least one second CCE corresponding to the at least one first CCE of a plurality of CCEs for the second beam to a plurality of control channels corresponding to the second beam.

The allocating of the rest CCEs to the plurality of control channels corresponding to the second beam may include: allocating the at least one second CCE to the first control channel; and allocating the rest CCEs to a plurality of control channels corresponding to the second beam.

The allocating of the rest CCEs to the plurality of control channels corresponding to the second beam may include: generating the plurality of control channels corresponding to the second beam using a plurality of control information for the rest terminals other than the first terminal among the plurality of terminals receiving the second beam; and determining a location of the at least one second CCE using a location of the at least one first CCE.

The number of CCEs for the first beam may be equal to the number of CCEs for the second beam.

The allocating of the rest CCEs to the plurality of control channels corresponding to the second beam may include: acquiring interference information by the second beam using information fed back from the first terminal; and determining whether to allocate the at least one second CCE to the first control channel based on the interference information.

Another embodiment of the present invention provides a method for transmitting, by a base station, a first control channel for a first terminal that receives a first beam as main beam and a second beam adjacent to the first beam as an interference beam. The method may include: determining a first value that is the number of CCEs allocated to the first control channel among a plurality of control channel elements (CCEs) available for the first beam; calculating a second value obtained by subtracting the first value from the number of CCEs available for the second beam; and allocating the same number of CCEs as the second value to a plurality of control channels corresponding to the second beam.

The method may further include: determining a first resource to which first control data of the first control channel among the control channel resources for the first beam is mapped; copying the first control data; and mapping the copied control data to a second resource at the same location as the first resource among control channel resources for the second beam.

The method may further include: after the mapping of the copied control data, mapping control data of the plurality of control channels to the rest resources other than the second resource among the control channel resources for the second beam.

The mapping of the control data of the plurality of control channels may include: mapping the control data of the plurality of control channels to the rest resources in a resource element group (REG) unit on the basis of a preset resource mapping order.

The plurality of control channels may be different from the first control channel, and The control data of the plurality of control channels may be generated after multiplexing and interleaving are performed on the plurality of control channels.

The calculating of the second value may include: determining the number of CCEs available for the second beam based on the number of time domain symbols for a control channel region to which the plurality of control channels are transmitted, a system bandwidth, the number of reference signals, and an amount of physical hybrid automatic repeat request indicator channel (PHICH).

DETAILED DESCRIPTION OF THE EMBODIMENTS

Figure 1:
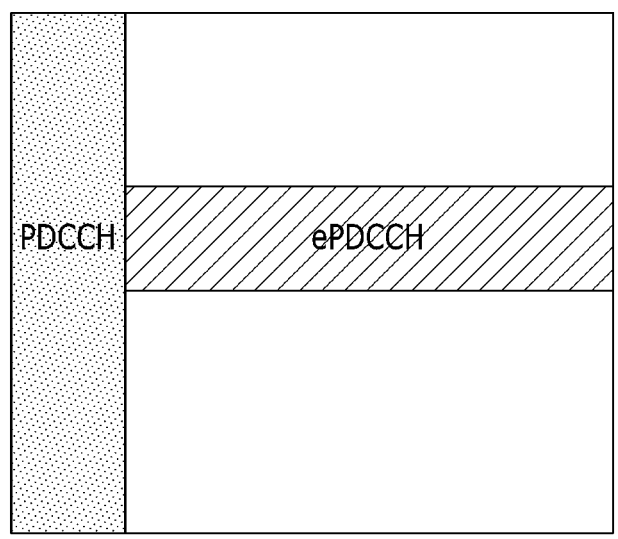
FIG. 1 is a diagram illustrating a PDCCH region and an ePDCCH region.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present specification, the overlapping description of the same components will be omitted.

It is to be understood that when one component is referred to as being "connected to" or "coupled to" another element, it may be connected directly to or coupled directly to another element or be connected to or coupled to another element, having the other element intervening therebetween. On the other hand, in the present specification, it is to be understood that when one element is referred to as being "connected directly to" or "coupled directly to" another element, it may be connected to or coupled to another element without the other element intervening therebetween.

Further, terms used in the present specification are used only in order to describe specific exemplary embodiments rather than limiting the present invention.

Further, in the present specification, singular forms may be intended to include plural forms unless the context clearly indicates otherwise.

Further, in the present specification, it will be further understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

Further, in the present specification, the term "and/or" includes a combination of a plurality of relevant items or any of a plurality of relevant items. In the present specification, 'A or B' may include 'A', 'B', or 'A and B'.

Further, in the present specification, a terminal may refer to a mobile terminal, a mobile station, an advanced mobile station, a high reliability mobile station, a subscriber station, a portable subscriber station, an access terminal, user equipment, and the like and may also include all or some of the functions of the terminal, the mobile terminal, the mobile station, the advanced mobile station, the high reliability mobile station, the subscriber station, the portable subscriber station, the access terminal, the user equipment, and the like.

Further, in the present specification, a base station (BS) may refer to an advanced base station, a high reliability base station, a nodeB, an evolved node B (eNodeB, eNB), an access point, a radio access station, a base transceiver station, a mobile multihop relay (MMR)-BS, a relay station serving as a base station, a high reliability relay station serving as a base station, a repeater, a macro base station, a small base station, and the like and may also include functions of all or some of the base station, the advanced base station, the HR-BS, the nodeB, the eNodeB, the access point, the radio access station, the base transceiver station, the MMR-BS, the relay station, the high reliability relay station, the repeater, the macro base station, the small base station, and the like.

Hereinafter, a method for allocating resources for a control channel and transmitting control information considering control channel information of a main transmission beam and interference information of adjacent beams in communication environment (hereinafter, 'multi-beam environment') using a multi beam will be described. In addition, a method for configuring and transmitting a control channel by being fed back with inter-beam interference in multi-beam environment will be described below.

FIG. 1 is a diagram illustrating a PDCCH region and an ePDCCH region.

A method for avoiding interference for an LTE system divides resources based on a frequency base and transmits control information of cells at different resource locations, like ePDCCH. In this case, the PDCCH region and the ePDCCH region are simultaneously used.

Hereinafter, a structure of using resources while improving performance by cooperative communication with adjacent beams using only a PDCCH region will be described.

Figure 2:
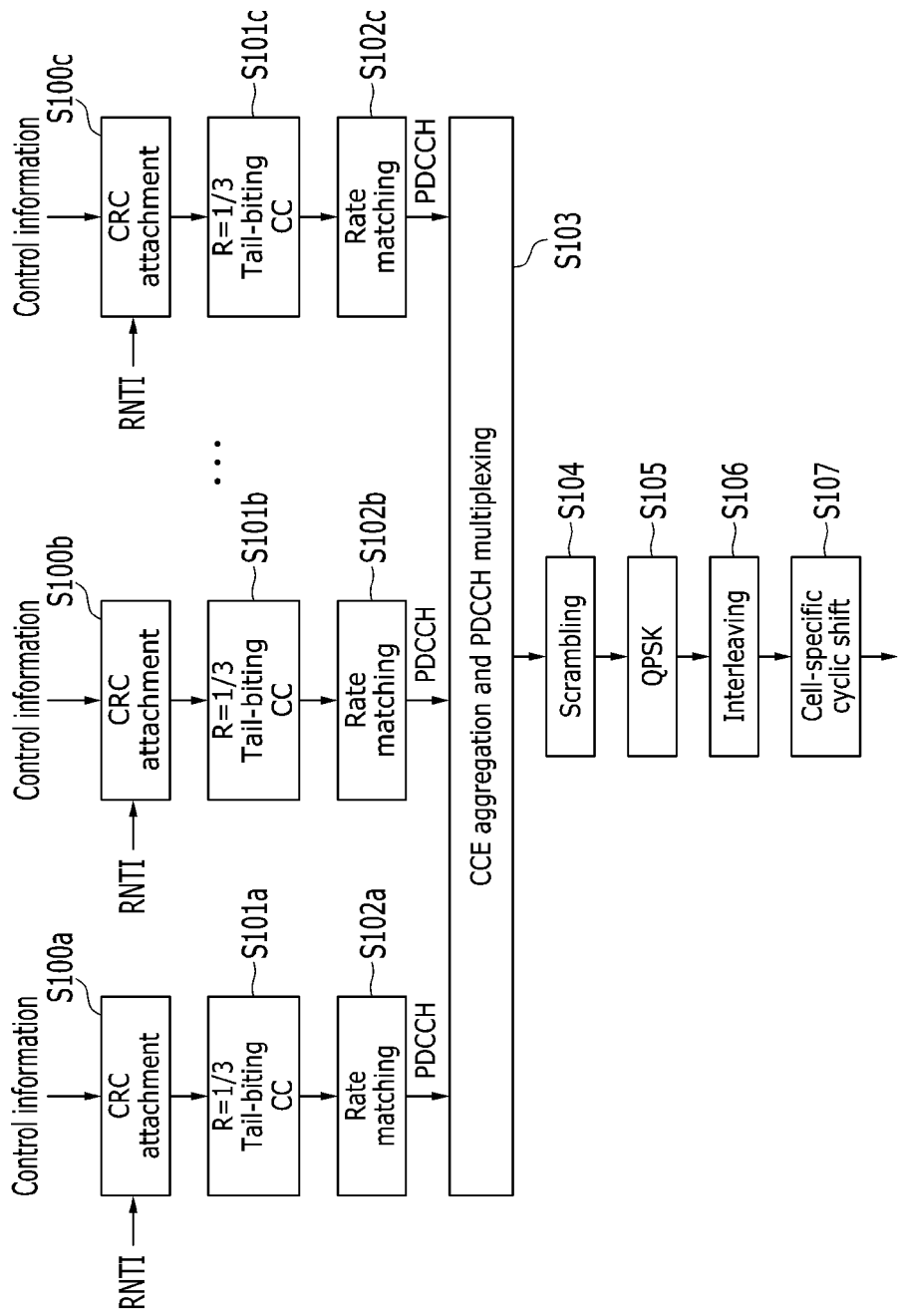
FIG. 2 is a diagram illustrating a method for simultaneously transmitting a plurality of control information.

FIG. 2 is a diagram illustrating a method for simultaneously transmitting a plurality of control information.

A terminal that receives data through a main transmission beam in a system using a multi beam suffers from interference due to data of adjacent beams.

In the case of the LTE system, a control channel region to which a control channel is transmitted is allocated to 1 to 3 time domain symbols (for example, orthogonal frequency division multiplexing (OFDM) symbol) within one subframe and the control information is transmitted while being distributed in the whole bandwidth of the control channel region.

The base station uses a plurality of control information, which is to be transmitted simultaneously, to generate a plurality of PDCCHs. Here, the control information includes data control information (DCI). The plurality of control information may also be information for a plurality of terminals and may also be information for one terminal. In detail, the base station attaches a cyclic redundancy check (CRC) based on a radio network temporary identifier of the corresponding terminal to a payload of a control information (for example, DCI) to be transmitted to the terminal (S100a, S100b, S100c). The base station performs tail-biting convolutional coding (TBCC) based on a rate (for example, R=⅓) on the control information to which the CRC is attached (S101a, S101b, S101c). The base station performs rate matching on the control information to which the TBCC is applied to generate the PDCCH (S102a, S102b, S102c).

The base station performs control channel element aggregation and PDCCH multiplexing on a plurality of generated PDCCHs (S103). The base station performs scrambling on multiplexed PDCCH (S104) and performs a quadrature phase shift keying modulation (S105). The base station performs interleaving on the QPSK modulated PDCCH (S106) and performs cell-specific cyclic shift (S107).

A process (S103) will be described in detail.

The base station processes a plurality of PDCCHs in a CCE unit to efficiently manage a control channel.

The base station may configure (CCE aggregation) one PDCCH as one CCE or a plurality of CCEs (for example, 2, 4, or 8 CCEs), based on the channel state between the base station and the terminal. The number of CCEs available in the control channel region is determined depending on the number of OFDMs allocated to the control channel region, the system bandwidth, the number of reference signals, and the amount of physical hybrid automatic repeat request indicator channel (PHICH) for a response signal (for example, ACK signal, NACK signal) of an uplink.

One CCE consists of 9 resource element groups (REG). One REG consists of 4 resource elements (RE). Therefore, one CCE includes 36 REs.

The PDCCH is interleaved in an REG unit and is discretely disposed on the frequency base.

The base station may perform the CCE aggregation on one PDCCH in a predetermined CCE unit (for example, 1 CCE, 2 CCEs, 4 CCEs, or 8 CCEs) depending on the channel state between the base station and the terminal.

For blind decoding of the terminal, the position of the available CCE is determined depending on a defined rule. When $K_{CCE,k}$ CCE are present within a control region of a k-th subframe, the terminal tries decoding a PDCCH candidate set (for example, set including PDCCH candidates).

The PDCCH candidate set for monitoring the terminal is defined in terms of a search space. In the aggregation level $L \in \{1, 2, 4, 8\}$, the search space is defined by a set of the PDCCH candidate spaces including the PDCCH candidate spaces (regions) in which the terminal monitors the PDCCH. The CCEs depending on a PDCCH candidate m of the search space is given as the following Equation 1.

$$L \times \{(Y_k + m) \bmod \lfloor N_{CCE,k}/L \rfloor\} + i \quad \text{[Equation 1]}$$

In the above Equation 1, i=0, 1, ..., L−1 and a variable Yk is defined as the following Equation 2. m=0, 1, ..., $M^{(L)}$−1, in which $M^{(L)}$ is the number of PDCCH candidates at a aggregation level L.

$$Y_k = (A \cdot Y_{k-1}) \bmod D \quad \text{[Equation 2]}$$

In the above Equation 2, $Y_{-1} = n_{RNTI} \neq 0$, A=39827, D=65537, k=$\lfloor n_s/2 \rfloor$. $n_s$ is the number of slot within one radio frame.

By the blind decoding process of the terminal, the base station selects the available CCE among the candidate CCEs having a position of a multiple of the aggregation level for the PDCCH of the terminal and transmits the selected CCE to the terminal.

Figure 3:
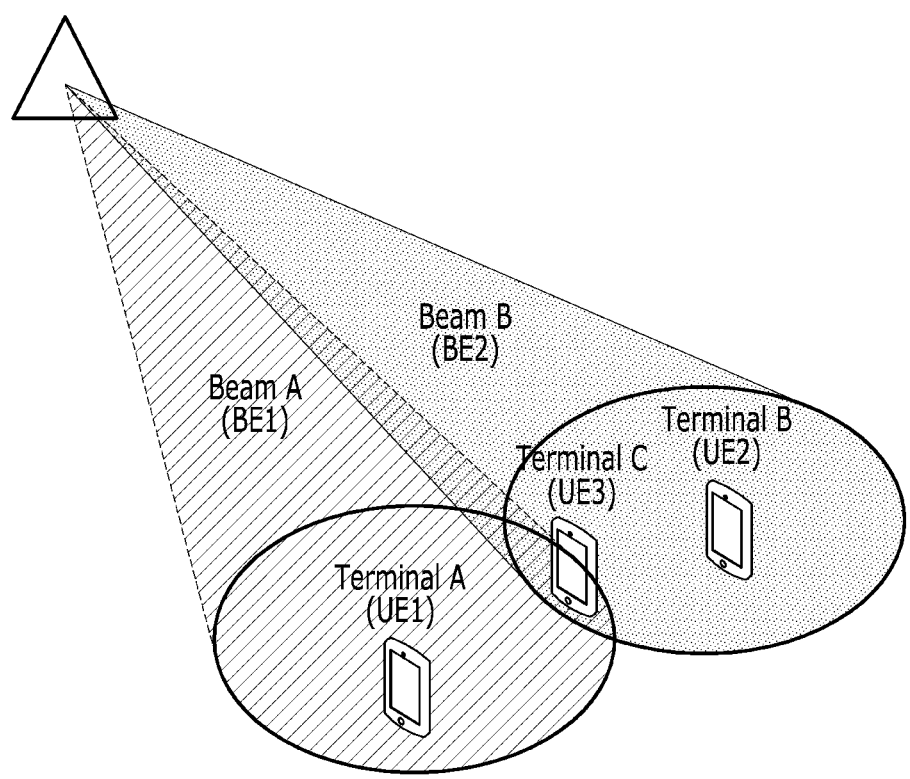
FIG. 3 is a diagram illustrating a case in which a plurality of terminals are supported by a plurality of beams.

FIG. 3 is a diagram illustrating a case in which a plurality of terminals are supported by a plurality of beams.

In detail, FIG. 3 illustrates that two beams BE1 and BE2 are simultaneously turned on by the base station to support three terminals UE1, UE2, and UE3, data of the terminal UE1 and the terminal UE3 are transmitted through the beam BE1, and data of the terminal UE2 are transmitted through the beam BE2. For example, the terminal UE3 receives the beam BE1 as a main beam and may receive the beam BE2 adjacent to the beam BE1 as an interference beam.

Figure 4:
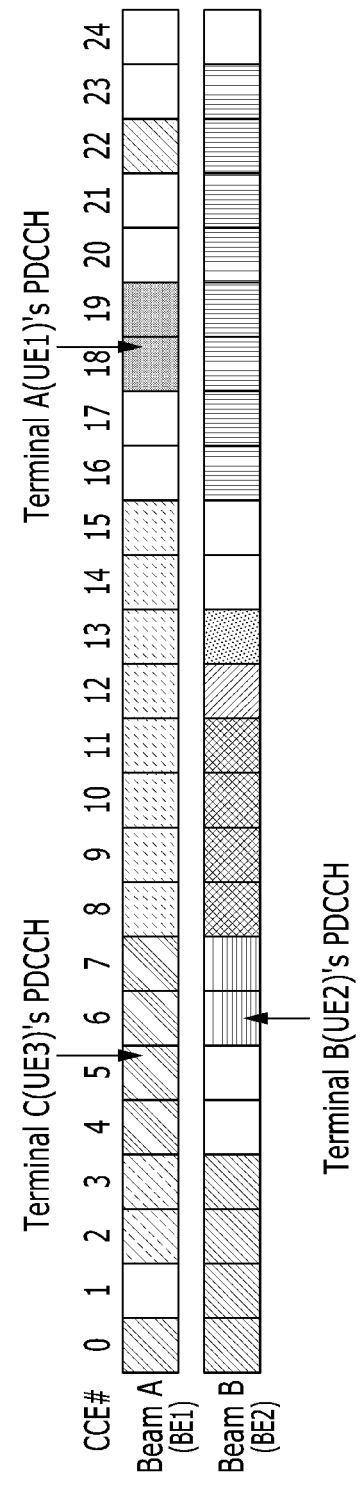
FIG. 4 is a diagram illustrating a method for allocating a control channel element (CCE) for a plurality of terminals.

The CCE configuring the control channels of the beam BE1 and the beam BE2 may be allocated as illustrated in FIG. 4 for the terminal UE1, the terminal UE2, and the terminal UE3.

FIG. 4 is a diagram illustrating a method for allocating a control channel element (CCE) for a plurality of terminals.

As illustrated in FIG. 4, the base station may interleave the CCE and may be discretely displayed in the resources. For example, the PDCCH for the terminal UE3 may be transmitted at CCEs Nos. 4 to 7 of a plurality of CCEs (CCEs Nos. 0 to 24) for the beam BE1 and the PDCCH for the terminal UE1 may be transmitted at CCEs Nos. 18 and 19. As another example, the PDCCH for the terminal UE2 may be transmitted at CCEs Nos 6 and 7 of a plurality of CCEs (CCEs Nos. 0 to 24) for the beam BE2. As another example, the PDCCHs for different terminals may be transmitted at the CCE No. 0 for the beam BE1, the CCEs Nos. 2 and 3 for the beam BE1, the CCEs Nos. 8 to 15 for the beam BE1, and the CCE No. 22 for the beam BE1. As another example, the PDCCH for different terminals may be transmitted at the CCEs Nos. 0 to 3 for the beam BE2, the CCEs Nos. 8 to 11 for the beam BE2, the CCE No. 12 of the beam BE2, the CCE No. 13 for the beam BE2, and the CCEs Nos. 16 to 23 for the beam BE2.

Meanwhile, the control channel information (for example, PDCCH) for the terminal UE2 is transmitted at the beam BE2 resources (for example, CCEs Nos. 6 and 7) of the same locations as the resources (for example, CCEs Nos. 6 and 7) to which the control channel information (for example, PDDCH) for the terminal UE3 is transmitted among the resources of the beam BE1. This is input to the terminal UE3 as the interference, and therefore the performance deterioration of the terminal UE3 may occur.

In the system environment, the terminal UE3 uses a reference signal that may figure out the channel status to estimate the channel status information of the main transmission beam (for example, BE1) and the interference of the adjacent beam (for example, BE2). Further, the terminal UE3 transmits the estimated result (for example, channel CQ1) to the base station. The base station uses the channel quality indication (CQ1) information fed back from the UE3 through a physical uplink control channel (PUCCH), or the like to acquire the status information on the channel to be transmitted to the terminal and acquire the interference information (hereinafter, 'first interference information') by the adjacent beam (for example, beam BE2 in the case of the terminal UE3). The base station may use the feedback information to determine the aggregation level L.

The base station may support the terminal UE3 based on the first interference information. In detail, the base station may use the control channel of the adjacent beam (for example, beam BE2 in the case of the terminal UE3) having large interference other than the main transmission beam (for example, beam BE1 in the case of the terminal UE3) to support the terminal UE3.

In this case, the base station may configure the control channel of the adjacent beam BE2 by applying the CCE location (for example, CCEs Nos. 4 to 7) determined for the PDCCH of the terminal UE3 at the main transmission beam BE1 to the adjacent beam BE2. This will be described with reference to FIG. 5.

Figure 5:
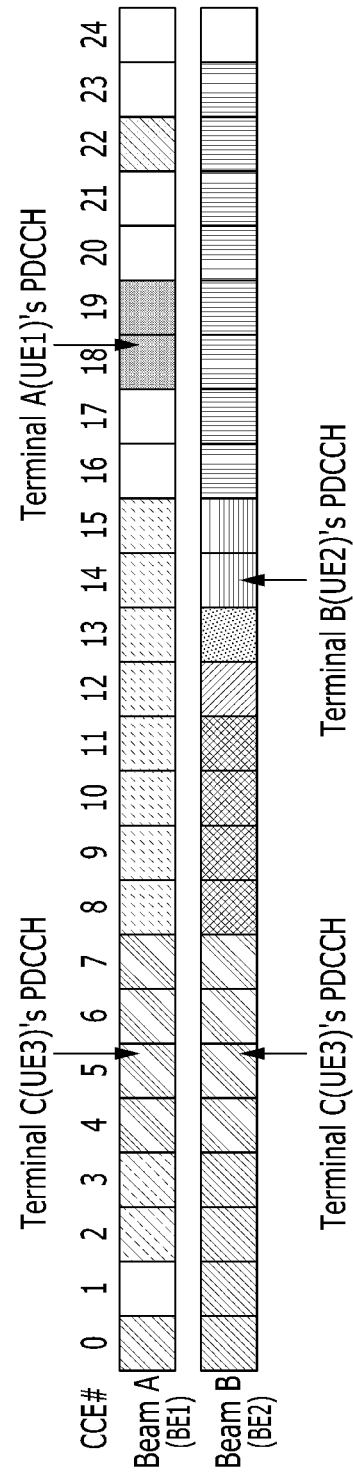
FIG. 5 is a diagram illustrating a method for configuring a control channel of adjacent beams by applying a CCE location determined in a main transmission beam to adjacent beams, according to an exemplary embodiment of the present invention.

FIG. 5 is a diagram illustrating a method for configuring control channels of adjacent beams by applying a CCE location determined in a main transmission beam to adjacent beams, according to an exemplary embodiment of the present invention.

In detail, FIG. 5 illustrates the case in which the number (for example, 25) of CCEs available for the main transmission beam BE1 and the number (for example, 25) of CCEs available for the adjacent beam BE2 are the same. In the present specification, when the location of the specific CCE for the main transmission beam BE1 and the location of the specific CCE for the adjacent beam BE2 are the same, the corresponding CCEs may have the same number of CCEs.

When the base station interleaves the CCE and discretely disposes the interleaved CCE in the resources, as illustrated in FIG. 5, the base station may configure the control channel of the adjacent beam BE2 by applying the CCE locations (for example, CCEs Nos. 4 to 7) determined for the PDCCH of the terminal UE3 at the main transmission beam BE1 to the adjacent beam BE2.

For example, the PDCCH for the terminal UE3 is transmitted at the CCEs Nos. 4 to 7 of the plurality of CCEs (CCEs Nos. 0 to 24) for the beam BE1 and the PDCCH for the terminal UE3 is transmitted at the CCEs Nos. 4 to 7 of the plurality of CCEs (CCEs Nos. 0 to 24) for the beam BE2.

As another example, the PDCCH for the terminal UE1 may be transmitted at CCEs Nos. 18 and 19 of the plurality of CCEs (CCEs Nos. 0 to 24) for the beam BE1. As another example, the PDCCHs for different terminals may be transmitted at the CCE No. 0 for the beam BE1, the CCEs Nos. 2 and 3 for the beam BE1, the CCEs Nos. 8 to 15 for the beam BE1, and the CCE No. 22 for the beam BE1.

As another example, the PDCCH for the terminal UE2 may be transmitted at CCEs Nos. 14 and 15 of the plurality of CCEs (CCEs Nos. 0 to 24) for the beam BE2. As another example, the PDCCH for different terminals may be transmitted at the CCEs Nos. 0 to 3 for the beam BE2, the CCEs Nos. 8 to 11 for the beam BE2, the CCE No. 12 for the beam BE2, the CCE No. 13 for the beam BE2, and the CCEs Nos. 16 to 23 for the beam BE2.

In this case, the method for transmitting, by a base station, a plurality of control information through a main transmission beam BE1 and the method for transmitting, by a base station, through an adjacent beam BE2 a plurality of control information will be described with reference to FIGS. 6 to 8.

Figure 6:
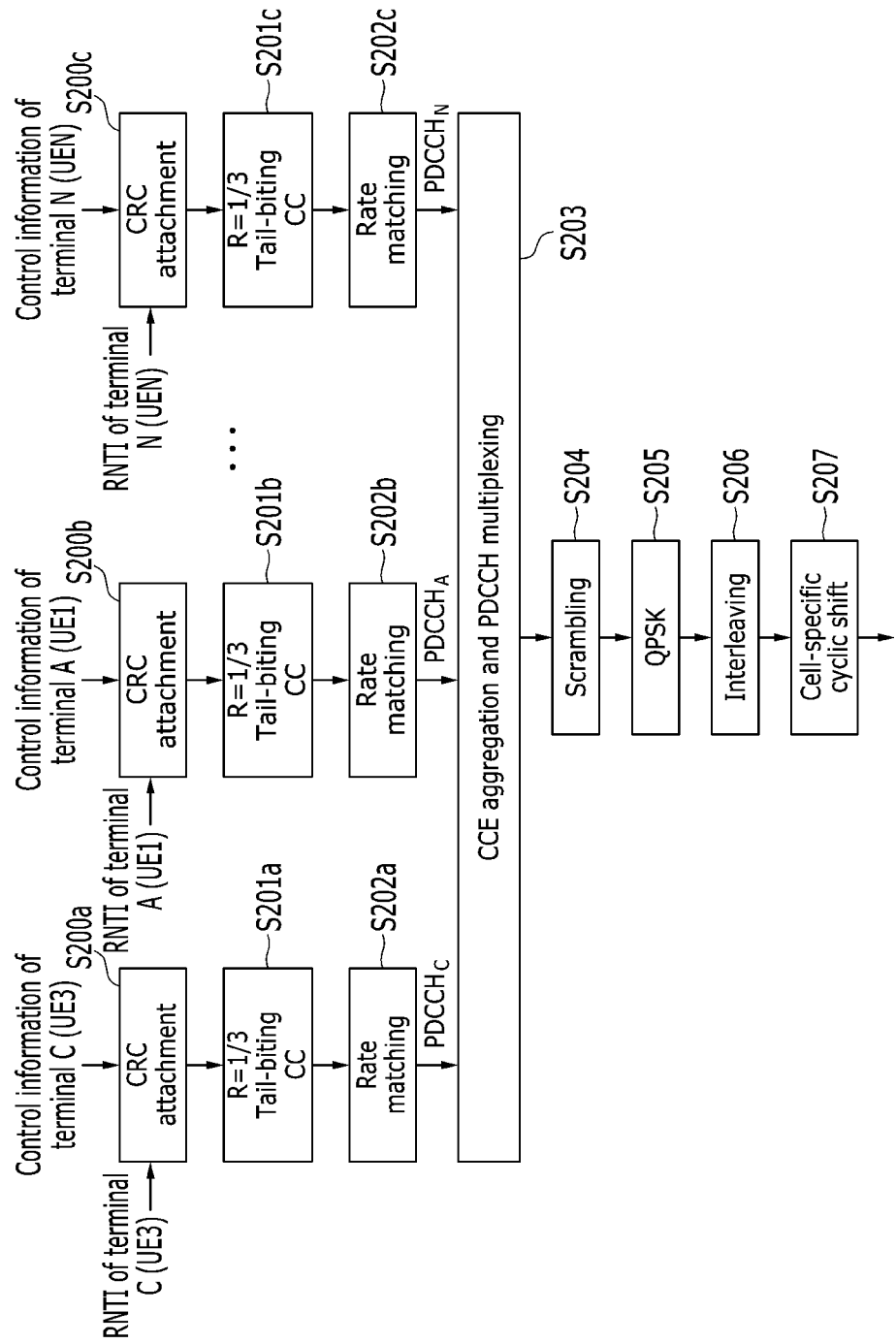
FIG. 6 is a diagram illustrating a method for transmitting a plurality of control information through a main transmission beam, according to an exemplary embodiment of the present invention.

FIG. 6 is a diagram illustrating a method for transmitting a plurality of control information through a main transmission beam, according to an exemplary embodiment of the present invention.

As illustrated in FIG. 6, the base station may perform processes (S200a-S200c, S201a-S201c, S202a-S202c, S203, S204, S205, S206, S207) of configuring a control channel of a main transmission beam BE1 and transmitting the configured control channel.

In detail, the base station attaches the CRC based on the RNTI of the corresponding terminal to the payload of the control information (for example, DCI) to be transmitted to the plurality of terminals UE3, UE1, . . . , UEN (S200a, S200b, and S200c). Here, the plurality of terminals UE3, UE1, . . . , UEN may be terminals affected by the main transmission beam BE1. For example, the base station attaches the CRC based on the RNTI of the terminal C UE3 to the payload of the control information (for example, DCI) to be transmitted to the terminal C UE3. As another example, the base station attaches the CRC based on the RNTI of the terminal A UE1 to the payload of the control information (for example, DCI) to be transmitted to the terminal A UE1. As another example, the base station attaches the CRC based on the RNTI of the terminal N UEN to the payload of the control information (for example, DCI) to be transmitted to the terminal N UEN.

The base station performs tail-biting convolutional coding (TBCC) based on a rate (for example, R=⅓) on the control information to which the CRC is attached (S201a, S201b, S201c).

The base station performs rate matching on the control information to which the TBCC is applied to generate the PDCCH (for example, $PDCCH_C$, $PDCCH_A$, ..., $PDCCH_N$) (S102a, S102b, S102c).

The base station performs the CCE aggregation and PDCCH multiplexing on the plurality of PDCCHs (for example, $PDCCH_C$, $PDCCH_A$, ..., $PDCCH_N$) (S203).

The base station performs scrambling on the multiplexed PDCCH (S204) and performs the QPSK modulation (S205).

The base station performs interleaving on the QPSK modulated PDCCH (S206) and performs the cell-specific cyclic shift (S207).

Meanwhile, the base station may allocate high priority (CCE allocation order) to the terminal UE3 in the CCE aggregation and PDCCH multiplexing process (S203) among the foregoing processes for the main transmission beam BE1 to allow the control channel (for example, $PDCCH_C$) for the terminal UE3 to preempt the resources. In detail, the base station may determine the CCE allocation order for the control channel ($PDCCH_C$) based on the first interference information. For example, the base station may set the CCE allocation order for the control channel (PDCCHc) to be higher than the CCE allocation order for other control channels ($PDCCH_A$, ..., $PDCCH_N$).

The base station may dispose the control channel (for example, $PDCCH_C$, or CCE for the $PDCCH_C$) for the terminal UE3 at a location of a first candidate region (for example, CCEs Nos. 4 to 7) among the control channel candidate regions (for example, control channel candidate region for the terminal UE3) of the main transmission beam BE1.

That is, the base station may allocate the CCE to the control channel (PDCCHc) for the terminal UE3 among the plurality of control channels (for example, $PDCCH_C$, $PDCCH_A$, ..., $PDCCH_N$) corresponding to the main transmission beam BE1 earlier than other control channels ($PDCCH_A$, ..., $PDCCH_N$).

Figure 7:
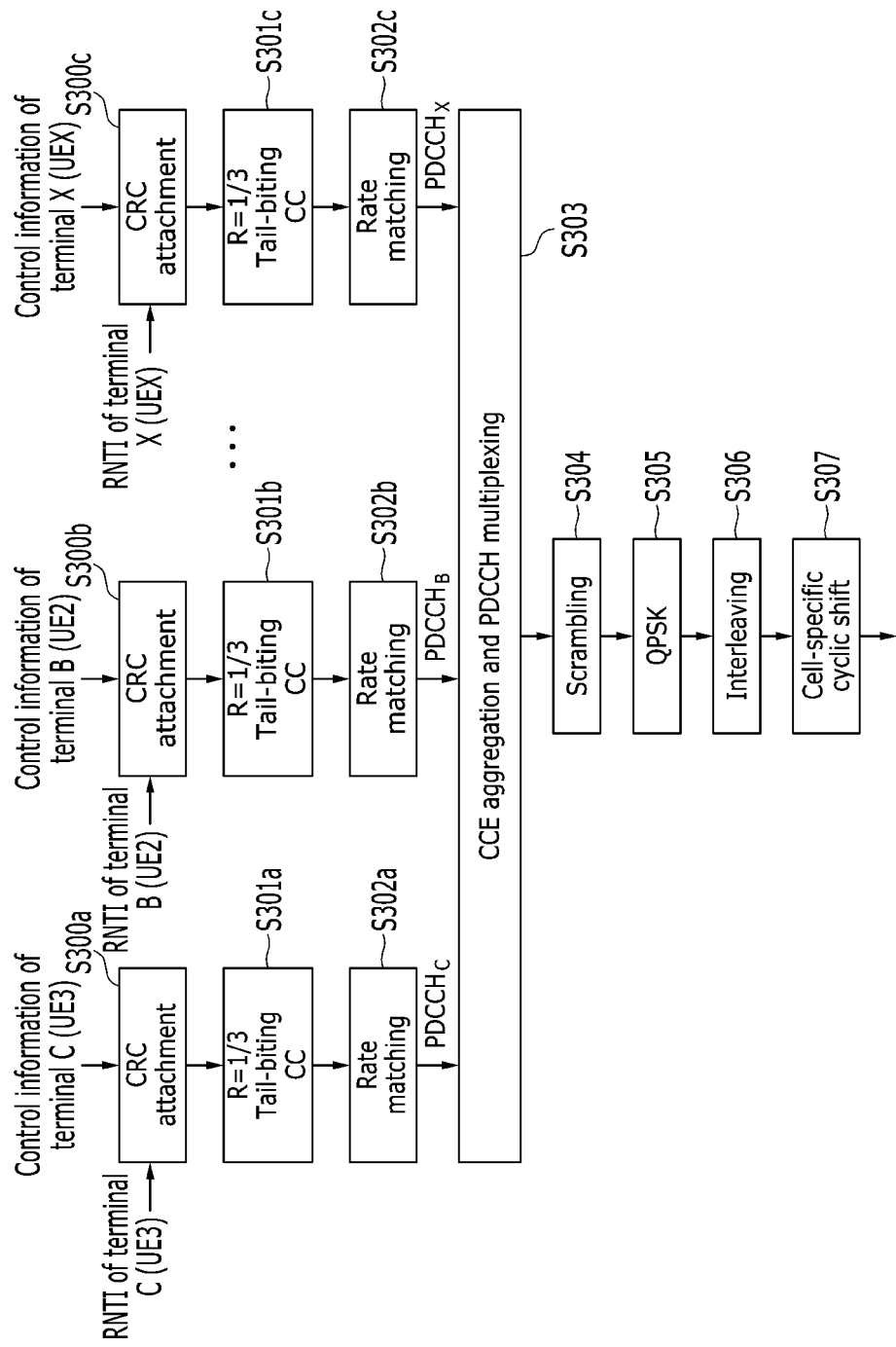
FIG. 7 is a diagram illustrating a method for transmitting a plurality of control information through adjacent beams, according to an exemplary embodiment of the present invention.

FIG. 7 is a diagram illustrating a method for transmitting a plurality of control information through adjacent beams, according to an exemplary embodiment of the present invention.

As illustrated in FIG. 7, the base station may perform processes (S300a-S300c, S301a-S301c, S302a-S302c, S303, S304, S305, S306, S307) of configuring and transmitting a control channel of an adjacent beam BE2.

In detail, the base station attaches the CRC based on the RNTI of the corresponding terminal to the payload of the control information (for example, DCI) to be transmitted to the plurality of terminals UE3, UE2, ..., UEX (S300a, S300b, S300c). Here, the plurality of terminals UE3, UE1, ..., UEN may be terminals affected by the adjacent beam BE2. For example, the base station attaches the CRC based on the RNTI of the terminal C UE3 to the payload of the control information (for example, DCI) to be transmitted to the terminal C UE3. As another example, the base station attaches the CRC based on the RNTI of the terminal B UE2 to the payload of the control information (for example, DCI) to be transmitted to the terminal B UE2. As another example, the base station attaches the CRC based on the RNTI of the terminal X UEX to the payload of the control information (for example, DCI) to be transmitted to the terminal X UEX.

The base station performs tail-biting convolutional coding (TBCC) based on a rate (for example, R=⅓) on the control information to which the CRC is attached (S301a, S301b, S301c).

The base station performs rate matching on the control information to which the TBCC is applied to generate the PDCCH (for example, $PDCCH_C$, $PDCCH_B$, ..., $PDCCH_X$) (S302a, S302b, S302c).

The base station performs the CCE aggregation and PDCCH multiplexing on the plurality of PDCCHs (for example, $PDCCH_C$, $PDCCH_B$, ..., $PDCCH_X$) (S303).

The base station performs scrambling on the multiplexed PDCCH (S304) and performs the QPSK modulation (S305).

The base station performs interleaving on the QPSK modulated PDCCH (S306) and performs cell-specific cyclic shift (S307).

Meanwhile, the base station may allocate high priority (CCE allocation order) to the terminal UE3 present in the common region (for example, common region between the beam BE1 and the beam BE2) in the CCE aggregation and PDCCH multiplexing process (S303) among the foregoing processes for the adjacent beam BE2 to allow the control channel (for example, $PDCCH_C$) for the terminal UE3 to preempt the resources. In detail, the base station may determine the CCE allocation order for the control channel ($PDCCH_C$) based on the first interference information. For example, the base station may set the CCE allocation order for the control channel (PDCCHc) to be higher than the CCE allocation order for other control channels ($PDCCH_B$, ..., $PDCCH_X$).

The base station may allow the control channels (for example, $PDCCH_C$, or CCE for the $PDCCH_C$) for the terminal to preempt resources earlier than the control channels (for example, $PDCCH_B$, ..., $PDCCH_X$) for other terminals (for example, UE2, ..., UEX) to prevent the control channels from being disposed in other candidate regions other than the first candidate regions (for example, CCEs Nos. 4 to 7) of the control channel candidate regions (for example, control channel candidate regions for the terminal UE3) of the adjacent beam BE2. That is, the base station may allocate the CCE to the control channel ($PDCCH_C$) for the terminal UE3 among the plurality of control channels (for example, $PDCCH_C$, $PDCCH_B$, ..., $PDCCH_X$) corresponding to the adjacent beam BE2 earlier than other control channels ($PDCCH_B$, ..., $PDCCH_X$). As illustrated in FIG. 6, the locations (or number) of the CCEs (CCEs Nos. 4 to 7) allocated to the control channel ($PDCCH_C$) for the terminal UE3 among a plurality of CCEs (CCEs Nos. 0 to 24) for the main transmission beam BE1 are the same as the locations (or number) of the CCEs (CCEs Nos. 4 to 7) allocated to the control channel ($PDCCH_C$) for the terminal UE3 among a plurality of CCEs (CCEs Nos. 0 to 24) for the adjacent beam BE2.

If in the process of disposing CCE in the process S303, the priority (for example, priority for CCE allocation (disposition)) of the UE3 present in the common region is lower than the priority (for example, priority for CCE allocation (disposition)) of other terminals (for example, UE2, ..., UE3), the location of the control information (or control channel) for the terminal C (UE30) within the control channel region of the main transmission beam (BE1) may be different from the locations of the control information (or control channel) for the terminal C UE3 within the control channel region of the adjacent beam BE2. In this case, the information of the adjacent beam BE2 does not help the main transmission beam BE1 and other control information (for example, PDCCH for other terminals) is affects the adjacent beam BE2 as interference.

Figure 8:
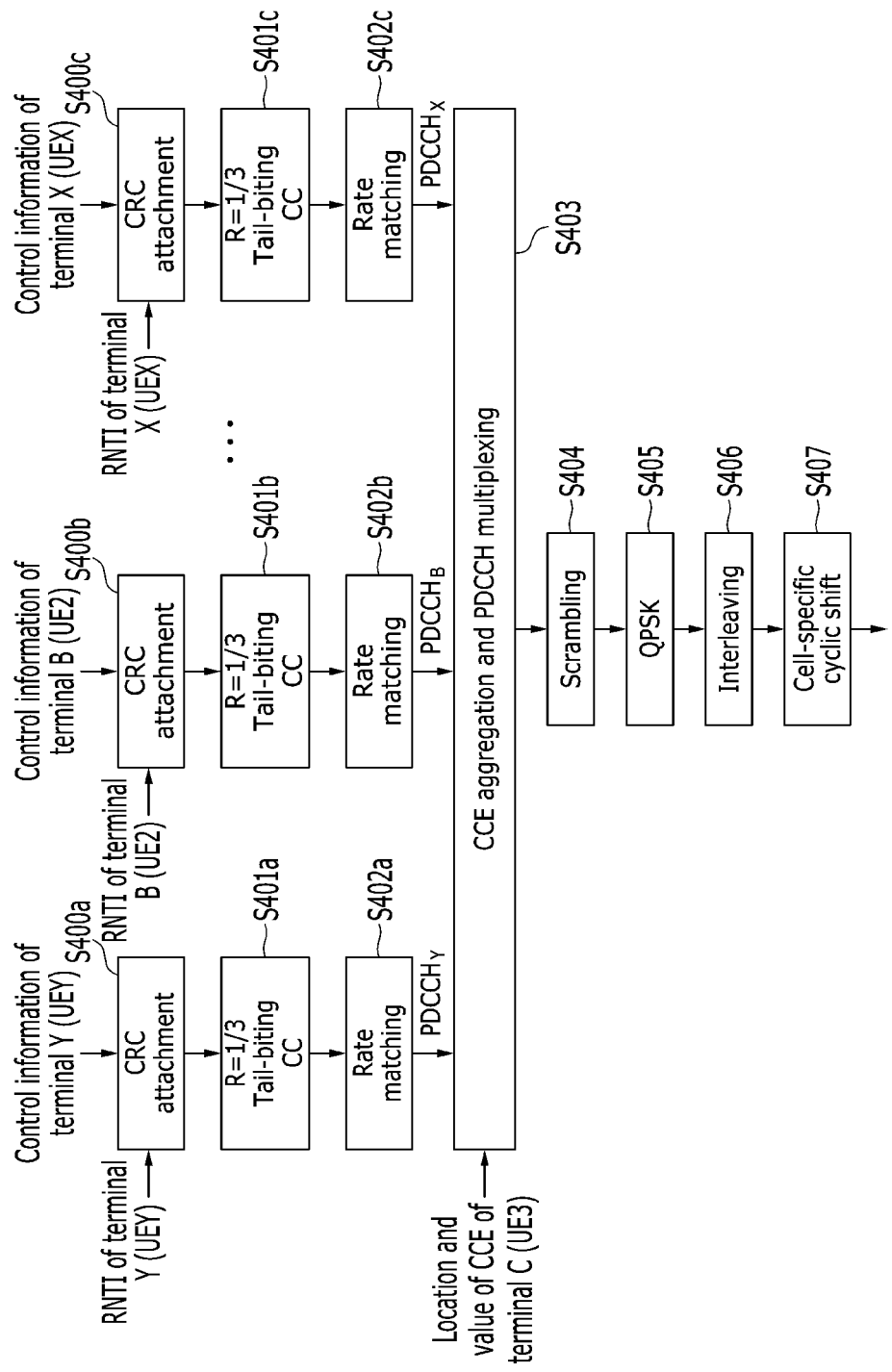
FIG. 8 is a diagram illustrating a method for transmitting a plurality of control information through adjacent beams, according to another exemplary embodiment of the present invention.

FIG. 8 is a diagram illustrating a method for transmitting a plurality of control information through adjacent beams, according to another exemplary embodiment of the present invention.

As illustrated in FIG. 8, the base station may perform processes (S400a-S400c, S401a-S401c, S402a-S402c, S403, S404, S405, S406, S407) of configuring and transmitting a control channel of an adjacent beam BE2.

In detail, the base station attaches the CRC based on the RNTI of the corresponding terminal to the payload of the control information (for example, DCI) to be transmitted to the plurality of terminals UEY, UE2, . . . , UEX (S400a, S400b, S400c). Here, the plurality of terminals UEY, UE2, . . . , UEX may be terminals affected by the adjacent beam BE2 and may not include the terminal C UE3. For example, the base station attaches the CRC based on the RNTI of the terminal Y UEY to the payload of the control information (for example, DCI) to be transmitted to the terminal Y UEY. As another example, the base station attaches the CRC based on the RNTI of the terminal B UE2 to the payload of the control information (for example, DCI) to be transmitted to the terminal B UE2. As another example, the base station attaches the CRC based on the RNTI of the terminal X UEX to the payload of the control information (for example, DCI) to be transmitted to the terminal X UEX.

The base station performs tail-biting convolutional coding (TBCC) based on a rate (for example, R=⅓) on the control information to which the CRC is attached (S401a, S401b, S401c).

The base station performs rate matching on the control information to which the TBCC is applied to generate the PDCCH (for example, PDCCH$_Y$, PDCCH$_B$, . . . , PDCCH$_X$) (S402a, S402b, S402c).

The base station performs the CCE aggregation and PDCCH multiplexing on the plurality of PDCCHs (for example, PDCCH$_Y$, PDCCH$_B$, . . . , PDCCH$_X$) (S403). In detail, the base station may use, for process S403, a CCE disposition result (hereinafter, 'first disposition result') for the terminal C UE3 generated in the CCE aggregation and PDCCH multiplexing process (for example, process S203 of FIG. 6) for the main transmission beam BE1. Here, the first disposition result includes the CCE location (for example, CCE number) and a CCE value (for example, PDCCH data) for the terminal C UE3.

The base station performs the scrambling on the multiplexed PDCCH (S404) and performs the QPSK modulation (S405).

The base station performs interleaving on the QPSK modulated PDCCH (S406) and performs the cell-specific cyclic shift (S407).

When the base station configures the control channel of the adjacent beam BE2 according to the method illustrated in FIG. 8, the base station does not perform the processes (for example, S300a, S301a, S302a) for generating a control channel (for example, PDCCH$_C$) for the terminal C UE3 present in the common region. That is, the base station does not perform the process (for example, S300a) of attaching the CRC based on the RNTI of the terminal C UE3 to the control information for the terminal C UE3.

However, the base station may perform the following process instead of the S300a, S3101a, and S302a of FIG. 7 to reduce the interference due to the adjacent beam BE2.

The base station may apply the CCE disposition result (first disposition result) for the terminal C UE3 generated in the CCE aggregation and PDCCH multiplexing process (for example, process S203 of FIG. 6) for the main transmission beam BE1 to the CCE aggregation and PDCCH multiplexing process (process S403 of FIG. 8) for the adjacent beam BE2. For example, the base station may determine whether to apply the first disposition result to the CCE aggregation and PDCCH multiplexing process (process S403 of FIG. 8) based on the first interference information. Meanwhile, according to the exemplary embodiment of FIG. 8, the base station need not set the CCE allocation (disposition) order of the terminal C UE3 to be higher than the CCE allocation order of other terminals in the CCE aggregation and PDCCH multiplexing process (for example, process S203 of FIG. 6) for the main transmission beam BE1.

In detail, in the CCE aggregation and PDCCH multiplexing process (process S403 of FIG. 8) for the adjacent beam BE2, the base station may use the first disposition result to perform the CCE disposition for the plurality of PDCCHs (for example, PDCCH$_Y$, PDCCH$_B$, . . . , PDCCH$_X$). For example, when the base station allocates the first CCEs (for example, CCEs Nos. 4 to 7) of the plurality of CCEs for the main transmission beam BE1 to the control channel (for example, PDCCH$_C$) for the terminal C UE3, the base station may allocate the rest CCEs other than the second CCEs (for example, CCEs Nos. 4 to 7) of the plurality of CCEs for the adjacent beam BE2 to the plurality of control channels (for example, PDCCH$_Y$, PDCCH$_B$, . . . , PDCCH$_X$) of the adjacent beam BE2. Here, the second CCEs (for example, CCEs Nos. Nos. 4 to 7) of the adjacent beam BE2 correspond to (for example, at the same location) the first CCEs (for example, CCEs Nos. 4 to 7) of the main transmission beam BE1. The base station may use the CCE locations (for example, locations of the first CCEs (for example, CCEs Nos. 4 to 7) of the main transmission beam BE1) included in the first disposition result to determine the locations of the second CCEs (for example, CCEs Nos. 4 to 7) of the adjacent beam BE2. The second CCEs (for example, CCEs Nos. 4 to 7) of the adjacent beam BE2 may be allocated to the control channel (for example, PDCCH$_C$) and the rest CCEs other than the second CCE of the plurality of CCEs for the adjacent beam BE2 may be allocated to other control channels (for example, PDCCH$_Y$, PDCCH$_B$, . . . , PDCCH$_X$). Meanwhile, the base station may determine whether to allocate the second CCEs (for example, CCEs Nos. 4 to 7) of the adjacent beam BE2 to the control channel (PDCCH$_C$) based on the first interference information.

That is, the base station may allocate the plurality of PDCCHs (for example, PDCCH$_Y$, PDCCH$_B$, . . . , PDCCH$_X$) for other terminals to the rest resource regions other than the resource region corresponding to the first disposition result among the control channel resource regions of the adjacent beam BE2.

Figure 9:
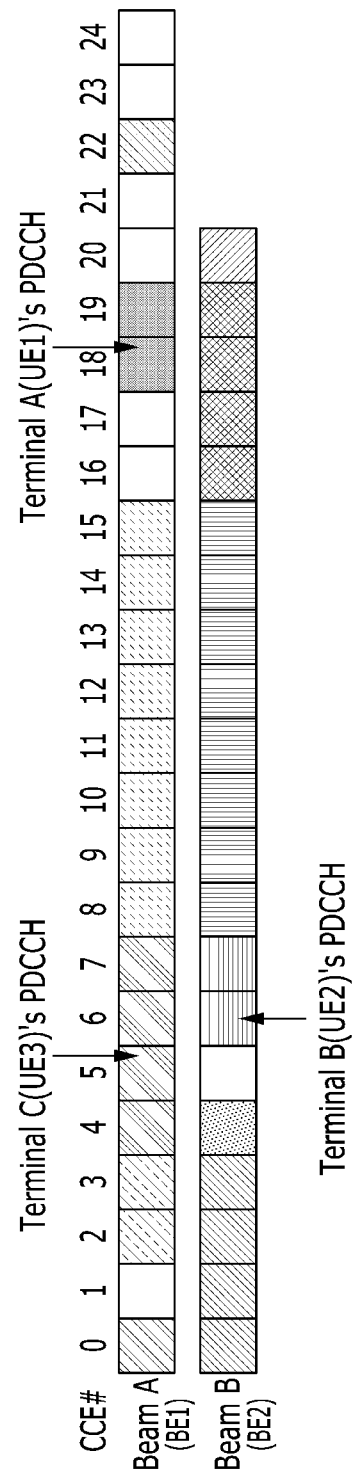
FIG. 9 is a diagram illustrating a method for configuring CCE for a main transmission beam and CCEs for adjacent beams, according to another exemplary embodiment of the present invention.

FIG. 9 is a diagram illustrating a method for configuring CCE for a main transmission beam and CCEs for adjacent beams, according to another exemplary embodiment of the present invention.

The base station allocates the PDCCHs for other terminals to the CCE in the state I which the CCE location for the terminal C UE3 is preempted, in the processes (for example, S303, S403) of multiplexing the control channel of the adjacent beam BE2.

If the control channel region of the main transmission beam BE1 and the control channel region of the adjacent beam BE2 have the same size (for example, the number of OFDM symbols occupied by the control channel region), the amount of PHICH of the main transmission beam BE1 is equal to the amount of PHICH of the adjacent beam BE2, and the number of reference signals of the main transmission beam BE1 is equal to the number of reference signals of the adjacent beam BE2, the CCEs that belong to different beams but are at the same location are allocated to the same resource region and transmitted.

However, if the conditions (for example, the size of the control channel region, the amount of PHICH, the number of reference signals, or the like) for configuring the control channel of the main transmission beam BE1 and the conditions (for example, the size of the control channel region, the amount of PHICH, the number of reference signals, or the like) for configuring the control channel of the adjacent beam BE2 are different from each other, the CCEs that belong to different beams but are at the same location may be allocated to different resource regions.

Consequently, as illustrated in FIG. 9, the base station may configure the CCEs for the main transmission beam BE1 and the CCEs for the adjacent beam BE2. In detail, the base station may set the size (for example, 25 CCEs) of the control channel region of the main transmission beam BE1 and the size (for example, 21 CCEs) of the control channel region of the adjacent beam BE2 to be different from each other.

For example, the PDCCH for the terminal C UE3 may be transmitted at CCEs Nos. 4 to 7 of a plurality of CCEs (CCEs Nos. 0 to 24) for the beam BE1 and the PDCCH for the terminal A UE1 may be transmitted at CCEs Nos. 18 and 19. As another example, the PDCCHs for different terminals may be transmitted at the CCE No. 0 for the beam BE1, the CCEs Nos. 2 and 3 for the beam BE1, the CCEs Nos. 8 to 15 for the beam BE1, and the CCE No. 22 for the beam BE1.

As another example, the PDCCH for the terminal B UE2 may be transmitted at CCEs Nos. 6 and 7 of the plurality of CCEs (CCEs Nos. 0 to 20) for the beam BE2 and the PDCCHs for different terminals may be transmitted at CCEs Nos. 0 to 3 for the beam BE2, the CCE No. 4 for the beam BE2, the CCEs Nos. 8 to 15 for the beam BE2, the CCEs Nos. 16 to 19 for the beam BE2, and the CCE No. 20 for the beam BE2.

The method for configuring CCE illustrated in FIG. 9 is arranged as follows.

The base station may determine the number (original number) of CCEs available for the control channel region of the adjacent beam BE2 having the large interference, based on the number (for example, 3) of OFDM symbols allocated for the control channel region of the adjacent beam BE2, the system bandwidth, the number of reference signals, the amount of PHICH, the amount of PCFICH, or the like.

The base station subtracts the number of CCEs for the control channel of the terminal C UE3 of the CCEs for the main transmission beam BE1 from the number (original number) of CCEs determined for the adjacent beam BE2. In detail, the base station may determine the number of CCEs allocated to the control channel (for example, PDCCH$_C$) for the terminal C UE3 among the plurality of CCEs available for the main transmission beam BE1 and then subtract the determined number of CCEs from the number of CCEs (original number) available for the adjacent beam BE2. Further, the base station may allocate the remaining number of CCE after the subtraction to the control channel of the adjacent beam BE2.

For example, when the number of CCEs available for the adjacent beam BE2 is 25 (for example, the original number before the number of CCEs for the terminal C UE3 is subtracted) and four CCEs for the terminal C UE3 are required, the number of CCEs available for the adjacent beam BE2 is finally 21 (=25−4). As a result, the number (for example, 25) of CCEs finally available for the main transmission beam BE1 and the number (for example, 21) of CCEs finally available for the adjacent beam BE2 are changed.

The base station allocates the control channel for the terminals (for example, except for terminal C UE3) present in the region of the adjacent beam BE2 to CCEs (for example, 21 numbers) finally available for the adjacent beam BE2.

Figure 10:
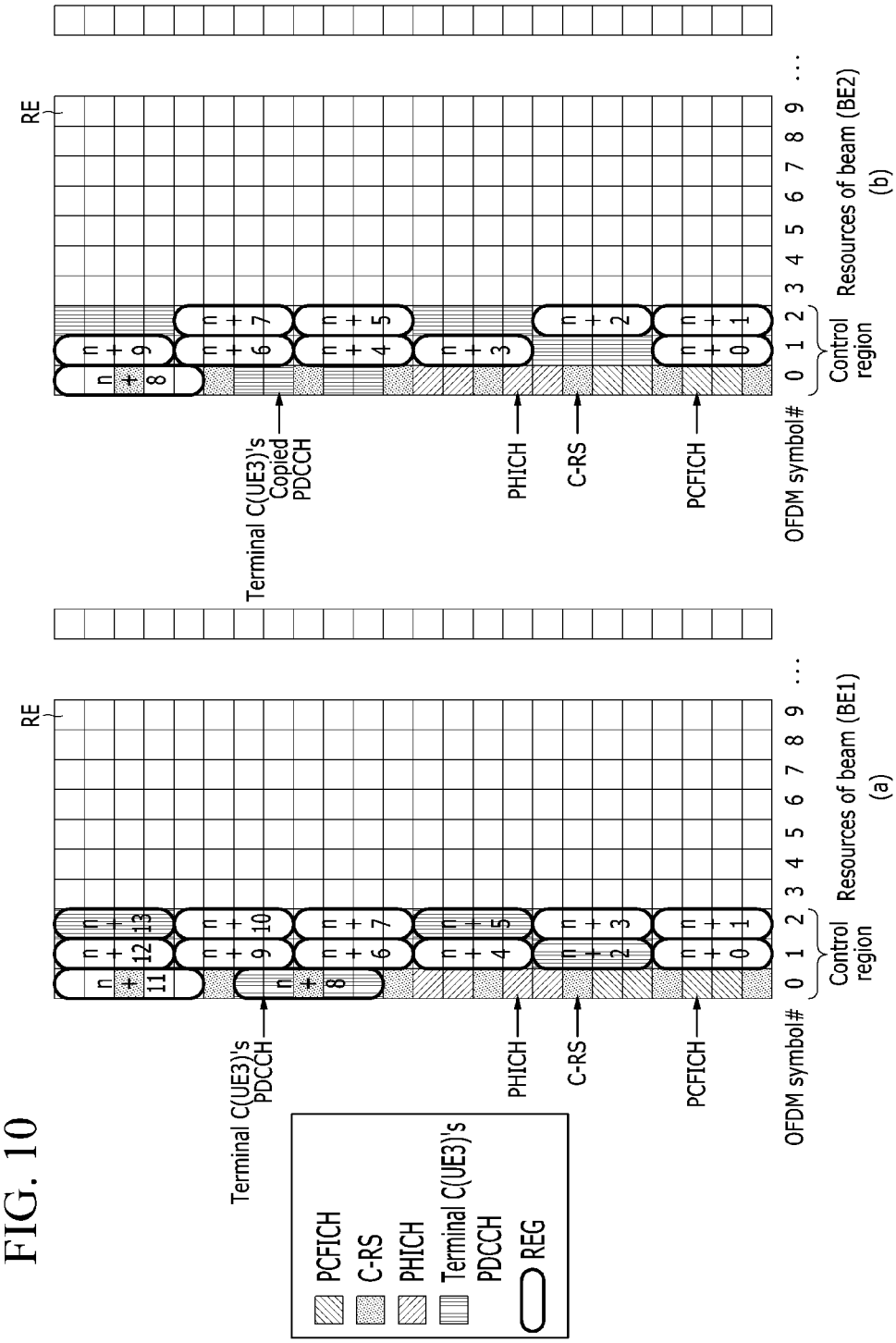
FIG. 10 is a diagram illustrating a method for disposing interleaved data in a resource region based on CCE for adjacent beams, according to an exemplary embodiment of the present invention.

When the CCE for the adjacent beam BE2 is configured as described above (for example, FIG. 9), the base station may dispose the interleaved control channel data (data mapped to the control channel region) in the resource region as illustrated in FIG. 10. The CCEs having a higher number are mapped to the resources earlier than the CCEs having a lower number.

FIG. 10 is a diagram illustrating a method for disposing interleaved control channel data in a resource region based on CCE for adjacent beams, according to an exemplary embodiment of the present invention.

In detail, FIG. 10A illustrates the resource disposition for the main transmission beam BE1 and FIG. 10B illustrates the resource disposition for the adjacent beam BE2.

The control channel data after the CCE multiplexing processes (for example, S203, S303, S403) are disposed in resources while being interleaved in an REG unit and may be disposed in the following resource disposition order (resource mapping order). In detail, the base station first performs the resource allocation (disposition, mapping) on the time base of the time base and the frequency base and performs the resource allocation (disposition, mapping) in an order from the lower frequency to the higher frequency with respect to the frequency base. FIG. 10 illustrates the case in which the frequency is higher upward with respect to the frequency base.

In this case, the base station disposes (allocates, maps) the control channel data in the rest resources other than the resource for the reference signal (for example, cell-specific reference signal (C-RS)) among the resources for the control region and the resource for the physical control field indicator channel (PCFICH), and the resource for the PHICH in an REG unit (for example, n+0, n+1, n+2, . . . , n+13) on the base of the resource disposition order. For example, in FIG. 10A, the control channel data for the terminal C UE3 may be mapped to REG (n+2, n+5, n+8, n+13).

In the resource disposition process, the entire control channel data of the adjacent beam BE2 may be disposed in the resource as follows.

When the base station configures the CCE for the adjacent beam BE2, the base station may determine the number of CCEs finally available for the adjacent beam BE2 in consideration of the control channel information for the terminal C UE3 among the control channel information of the main transmission beam BE1.

To improve the reception performance of the control channel of the terminal C UE3 present in the interference region between the adjacent beam BE2 and the main transmission beam BE1, the base station may determine the location (hereinafter, 'first REG location') of the REG corresponding to the control channel (for example, PDCCH$_C$) for the terminal C UE3 among the control channel resources of the main transmission beam BE1. That is, the base station may determine a resource (hereinafter, 'first resource') to which the control channel data of the control channel (PDCCH$_C$) among the resources for the control region of the main transmission beam BE1 is mapped.

Further, the base station may copy the control channel data (for example, control channel data of the PDCCH$_C$) for the terminal C UE3.

Further, as illustrated in FIG. 10B, the base station may dispose (allocate, map) the copied control channel data in the resource corresponding to the first REG location among the control channel resources of the adjacent beam BE2. That is, the base station may map the copied control channel data (for example, control channel date of the PDCCH$_C$) to a resource (hereinafter, 'second resource') at the same location as the first resource among the resources for the control region of the adjacent beam BE2.

Further, the base station may dispose (allocate, map) the control channel data of the adjacent beam BE2 in the rest resources other than the resource corresponding to the first REG location among the control channel resources of the adjacent beam BE2. That is, the base station may map the copied control channel data to the second resource and then map the control channel data of the adjacent beam BE2 to the rest resources other than the second resource among the resources for the control region of the adjacent beam BE2. For example, as illustrated in FIG. 10B, the control channel data (for example, control channel data for the rest terminals other than the terminal C UE3 among the terminals affected by the adjacent beam BE2) of the adjacent beam BE2 may be mapped to the resource in the REG unit (for example, n+0, n+1, . . . , n+9).

According to the method illustrated in FIG. 10, the base station may improve the performance of the control channel for the terminal (for example, UE3) within the interference region while using the existing control channel region (for example, region corresponding to 1 to 3 OFDM symbols within the subframe).

Figure 11:
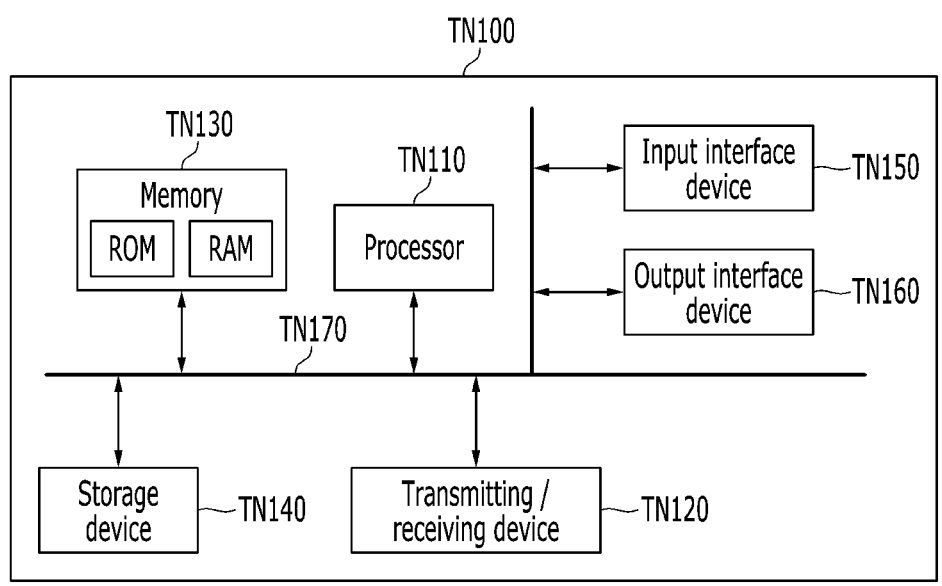
FIG. 11 is a diagram illustrating a wireless device (or communication node) according to an exemplary embodiment of the present invention.

FIG. 11 is a diagram illustrating a wireless device (or communication node) according to an exemplary embodiment of the present invention. A wireless device TN100 illustrated in FIG. 11 may be the base station, the terminal, or the like described in the present specification and may be a transmitter or a receiver.

In the exemplary embodiment of FIG. 11, the wireless device TN100 may include at least one processor TN110, a transmitting/receiving device TN120 connected to a network to perform communication, and a memory TN130. Further, the wireless device TN100 may further include a storage device TN140, an input interface device TN150, an output interface device 160, or the like. Components included in the wireless device TN100 may be connected to each other by a bus TN170 to communicate with each other.

The processor TN110 may run a program command that is stored in at least one of the memory TN130 and the storage device TN140. The processor TN110 may mean a central processing unit (CPU), a graphics processing unit (GPU), or an exclusive processor that performs the methods according to the exemplary embodiments of the present invention. The processor TN110 may be configured to implement the procedures, the functions, and the methods described with reference to the exemplary embodiment of the present invention. The processor TN110 may control each of the components of the wireless device TN100.

The memory TN130 and the storage device TN140 may each store various information associated with the operation of the processor TN110. The memory TN130 and the storage device TN140 may each be configured of at least one of a volatile storage medium and a non-volatile storage medium. For example, the memory TN130 may be configured of at least one of a read only memory (ROM) and a random access memory (RAM).

The transmitting/receiving device TN120 may transmit or receive a wired signal or a wireless signal. Further, the wireless device TN100 may have a single antenna or multiple antennas.

According to an exemplary embodiment of the present invention, it is possible to improve the communication performance of the communication system using a multi-beam by selecting the adjacent beams using the interference information of the fed back adjacent beams and transmitting the control information of the main transmission beam in the control channel of the adjacent beams using the resource allocation information (for example, resource allocation information for a control channel) of the main transmission beam.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting, by a base station, a first control channel for a first terminal that receives a first beam as main beam and a second beam adjacent to the first beam as an interference beam, the method comprising:

allocating at least one control channel element (CCE) to the first control channel earlier than allocating to the rest control channels other than the first control channel among a plurality of control channels corresponding to the first beam, when CCEs are allocated to the plurality of control channels corresponding to the first beam; and allocating at least one CCE to the first control channel earlier than allocating to the rest control channels other than the first control channel among a plurality of control channels corresponding to the second beam, when CCEs are allocated to the plurality of control channels corresponding to the second beam.

2. The method of claim 1, wherein:

the allocating of at least one CCE to the first control channel among the plurality of control channels corresponding to the first beam includes allocating at least one first CCE of a plurality of CCEs for the first beam to the first control channel, and the allocating of at least one CCE to the first control channel among the plurality of control channels corresponding to the second beam includes allocating at least one second CCE corresponding to the at least one first CCE of a plurality of CCEs for the second beam to the first control channel.

3. The method of claim 2, wherein:

the number of CCEs for the first beam is equal to the number of CCEs for the second beam.

4. The method of claim 1, wherein:
the allocating of at least one CCE to the first control channel among the plurality of control channels corresponding to the first beam includes:
acquiring interference information by the second beam using information fed back from the first terminal; and
determining a CCE allocation order for the first control channel based on the interference information.

5. The method of claim 1, wherein:
the allocating of at least one CCE to the first control channel among the plurality of control channels corresponding to the second beam includes
generating the first control channel of the plurality of control channels corresponding to the second beam using first control information for the first terminal;
generating a second control channel of the plurality of control channels corresponding to the second beam using second control information for a second terminal receiving the second beam as the main beam; and
setting the CCE allocation order for the first control channel to be higher than a CCE allocation order for the second control channel.

* * * * *